(12) United States Patent
Straus et al.

(10) Patent No.: US 6,890,469 B2
(45) Date of Patent: May 10, 2005

(54) SELECTIVELY CONTROLLING IN-MOLD COATING FLOW

(75) Inventors: Elliott J. Straus, Akron, OH (US); John A. Thompson, Wooster, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 70 days.

(21) Appl. No.: 10/045,481

(22) Filed: Oct. 22, 2001

(65) Prior Publication Data

US 2003/0082344 A1 May 1, 2003

(51) Int. Cl.$^7$ .............................................. B29C 45/16
(52) U.S. Cl. ............... 264/255; 264/328.8; 264/328.12
(58) Field of Search ................................ 264/255, 275, 264/279, 328.7, 328.8, 328.12

(56) References Cited

U.S. PATENT DOCUMENTS

| 2,337,550 A | 12/1943 | Crosby |
| 4,076,788 A | 2/1978 | Ditto |
| 4,081,578 A | 3/1978 | Van Essen et al. |

(Continued)

FOREIGN PATENT DOCUMENTS

| EP | 0 625 418 A1 | 11/1994 |
| EP | 0 733 668 A | 9/1996 |
| EP | 0 934 808 A | 8/1999 |
| EP | 1 207 031 A | 5/2002 |
| FR | 2781715 | 7/1998 |
| JP | 09 052262 | 2/1997 |
| WO | WO 95 13177 | 5/1995 |
| WO | WO 01 07230 A | 2/2001 |
| WO | PCT/CA01/00534 | 4/2001 |
| WO | WO 01 81065 A1 | 11/2001 |
| WO | WO 03 035354 A | 5/2003 |

OTHER PUBLICATIONS

The Sabreen Group, Inc.'s "Preparing Plastics for Painting" article. Oct. 1999.
Chlorocarbons and Chlorohydrocarbons–$C_2$ to Combustion Technology, Kirk–Othmer *Encyclopedia of Chemical Technology*, Fourth Edition, vol. 6, (1993), pp. 676–690.
GE Plastics Processing Guide, *GE Engineering Thermoplastics Injection Molding Processing Guide*, General Electric, 1998, pp. i–iv.
GE Injection Molding Mold Design, *GE Engineering Thermoplastics Injection Molding Processing Guide*, General Electric, 1998, pp. 1–1–1–24.
GE Injection Molding Processing, *GE Engineering Thermoplastics Injection Molding Processing Guide*, General Electric, 1998, pp. 2–1–2–12.
GE Injection Molding Troubleshooting Guide, *GE Engineering Thermoplastics Injection Molding Processing Guide*, General Electric, 1998, pp. 3–1–3–7.
Long Fiber Reinforced Thermoplastics, *Injection Molding Guide*, Celstran, 1999, pp. 1–27.
U.S. Appl. Ser. No. 60/198,691, Brett, filed Apr. 20, 2001.
Patent Abstract of Japan, vol. 018, No. 094, Feb. 16, 1994 & JP 05 301251 A, Nov. 16, 1993.
Patent Abstract of Japan, vol. 1997, No. 06, Jun. 30, 1997.
International Search Report pertaining to International Application No. PCT/US03/10256.

*Primary Examiner*—Edmund H. Lee
(74) *Attorney, Agent, or Firm*—Fay, Sharpe, Fagan, Minnich & McKee, LLP; David G. Burleson

(57) ABSTRACT

Molded articles or substrates having an in-mold coating thereon are disclosed. The in-mold coated substrates are produced by a method wherein the flow of the in-mold composition onto the substrate can be selectively controlled. The molded articles can be preferentially coated in desired or predetermined areas with in-mold coating compositions by controlling the thickness or depth of various sections of the substrate.

24 Claims, 5 Drawing Sheets

U.S. PATENT DOCUMENTS

| | | | |
|---|---|---|---|
| 4,115,506 A | * 9/1978 | Shima | 264/250 |
| 4,189,517 A | 2/1980 | Shanoski et al. | |
| 4,222,929 A | 9/1980 | Shanoski et al. | |
| 4,316,869 A | 2/1982 | Van Gasse | |
| 4,331,735 A | 5/1982 | Shanoski | |
| 4,350,739 A | 9/1982 | Mohiuddin | |
| 4,366,109 A | 12/1982 | Svoboda | |
| 4,389,358 A | * 6/1983 | Hendry | 264/45.1 |
| 4,414,173 A | 11/1983 | Cobbledick et al. | |
| 4,515,710 A | 5/1985 | Cobbledick | |
| 4,668,460 A | 5/1987 | Ongena | |
| 4,711,602 A | 12/1987 | Baker | |
| 4,783,298 A | * 11/1988 | Oda | 264/155 |
| 4,798,697 A | 1/1989 | Nohara et al. | |
| 4,921,669 A | 5/1990 | Vetter et al. | |
| 4,931,234 A | 6/1990 | Schad et al. | |
| 4,950,154 A | 8/1990 | Moberg | |
| 4,963,312 A | 10/1990 | Müller | |
| 5,053,177 A | 10/1991 | Vetter et al. | |
| 5,084,353 A | 1/1992 | Cobbledick et al. | |
| 5,132,052 A | 7/1992 | Cobbledick et al. | |
| 5,359,002 A | 10/1994 | Cobbledick et al. | |
| 5,391,399 A | 2/1995 | Cobbledick et al. | |
| 5,496,509 A | 3/1996 | Yamamoto et al. | |
| 5,562,979 A | 10/1996 | Easterlow et al. | |
| 5,614,581 A | 3/1997 | Cobbledick et al. | |
| 5,632,949 A | 5/1997 | Fisher et al. | |
| 5,639,403 A | 6/1997 | Ida et al. | |
| 5,658,672 A | 8/1997 | Lenke et al. | |
| 5,736,090 A | 4/1998 | Yamamoto et al. | |
| 5,777,053 A | 7/1998 | McBain et al. | |
| 5,849,168 A | * 12/1998 | Lutz | 264/255 |
| 5,882,559 A | 3/1999 | Eckardt et al. | |
| 5,902,534 A | 5/1999 | Fujishiro et al. | |
| 5,906,788 A | 5/1999 | Boeckler | |
| 5,925,386 A | 7/1999 | Moberg | |
| 6,174,158 B1 | 1/2001 | Seres, Jr. et al. | |
| 6,180,043 B1 | 1/2001 | Yonemochi et al. | |
| 6,261,075 B1 | 7/2001 | Lee et al. | |
| 6,287,488 B1 | 9/2001 | Dougherty et al. | |
| 6,328,920 B1 | * 12/2001 | Uchiyama et al. | 264/255 |
| 6,409,955 B1 | 6/2002 | Schmitt et al. | |
| 6,558,599 B1 | * 5/2003 | Bethune | 264/255 |

\* cited by examiner

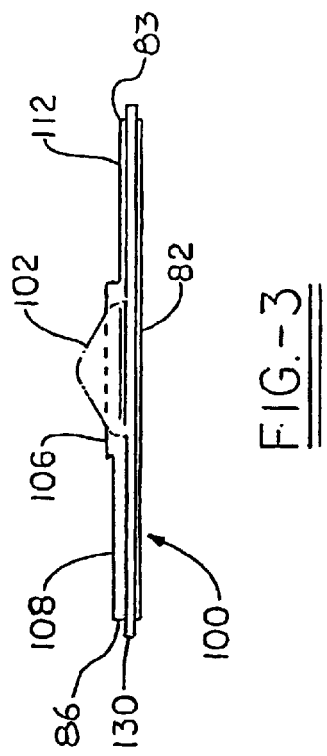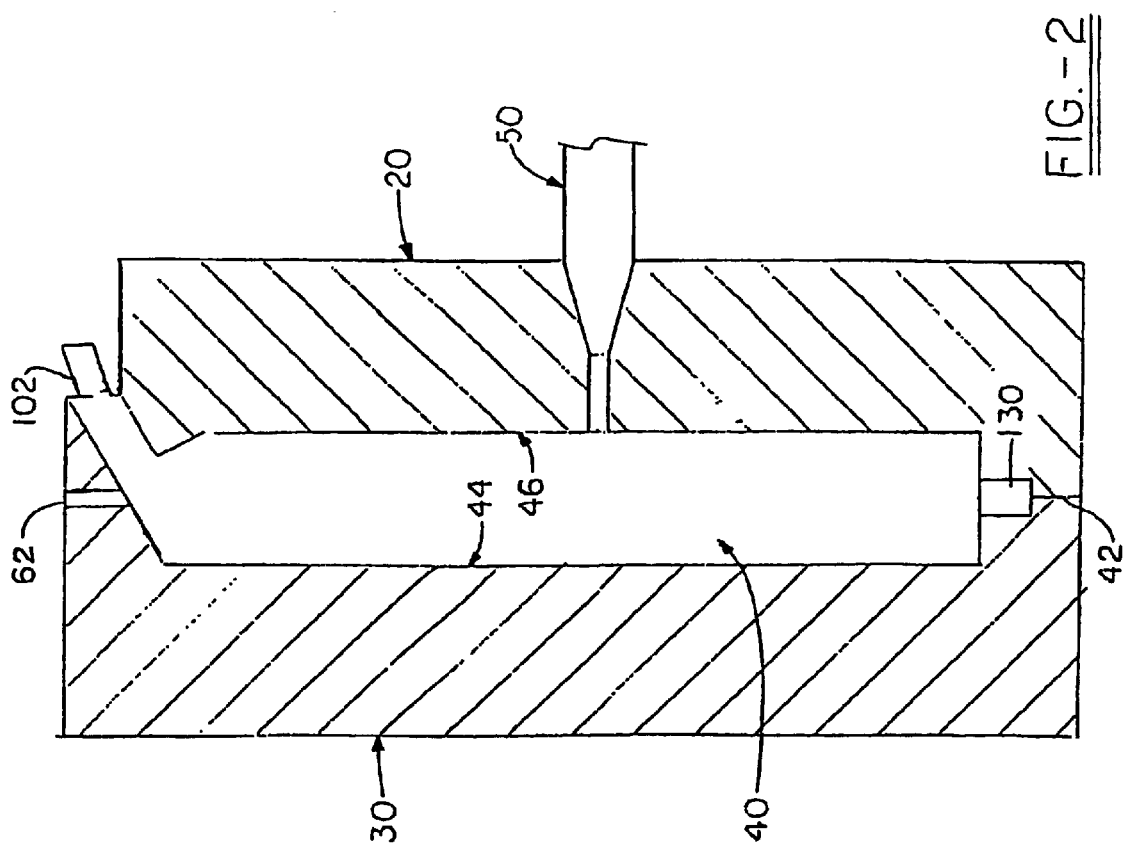

SELECTIVELY CONTROLLING IN-MOLD COATING FLOW

FIELD OF THE INVENTION

The present invention relates to a method for coating a molded article or substrate with an in-mold composition, wherein the flow and thus the thickness of the in-mold composition onto the substrate can be selectively controlled. Importantly, desired areas of molded articles can be preferentially coated with in-mold coating compositions by controlling the thickness or depth of various sections of the substrate. Advantageously, the method of the present invention can be utilized to mold articles of relatively complex shape or design which have an in-mold coating thereon having a uniform or desired appearance.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping off of the desired surface and out of the mold cavity. The in-mold coating containment flange extends substantially completely around the perimeter of a molded substrate surface where the in-mold coating has been applied thereto.

BACKGROUND OF THE INVENTION

Molded thermoplastic and thermoset articles, such as those made from polyolefins, polycarbonate, polyester, polyethylene, polypropylene, polystyrene and polyurethanes, are utilized in numerous applications including those for the automotive, marine, recreation, construction, office products, and outdoor equipment industries. For example, automotive industry applications include body panels, wheel covers, bumpers, head and tail lamps, fenders, hoods, and dashboards.

Use of the molded articles is not without problem, as the surface quality may not meet required standards, such as durability, chemical resistance, and weather resistance. In many instances, the molded thermoplastic articles may need to be coated to satisfy the above-noted requirements or to facilitate paint adhesion.

Countless methods have been developed to apply various coatings to the molded articles to improve the surface characteristics thereof.

Previously, molded work pieces were formed in a mold, the molded product removed, and a coating was then applied on the surface of the molded work piece by a coating process, such as a surface treatment, primer coating, top coating, painting, etc. Hence the foregoing methods required an additional step to achieve a finished surface on a work piece, i.e. treating the surface of the pre-formed work piece prior to applying a paint or coating. These methods required additional steps and increased costs of preparing the molded work piece surface.

It became desirable, therefore, to have a method by which a coating could be applied to a work piece in the mold, resulting in a coated work piece the surface of which would be finished and suitable for use as is in an end use application, or which would require less or no surface preparation treatment than heretofore utilized.

The application of in-mold coatings (IMC) to thermoplastic or thermoset materials to provide generally smooth surfaces, improve durability and other surface properties, and to reduce or eliminate substrate porosity is known. A number of in-mold coating methods have been employed for applying coatings, in compression molding methods or injection molding methods employing molding materials of thermosetting resins, such as SMC (sheet molding compound) and BMC (bulk molding compound) (e.g., U.S. Pat. Nos. 4,076,788; 4,081,578; 4,331,735; 4,366,109; and 4,668,460).

Heretofore, the in-mold coatings which have been applied to molded articles typically covered the entire surface of the article. The coverage of the coating was controlled by only the amount of coating applied, such as in the case of an undershot, or the physical boundaries of the mold cavity.

SUMMARY OF THE INVENTION

An improved method for applying in-mold coatings has been developed, whereby molded articles can be preferentially coated in desired area, and depth of coating can be regulated by selectively controlling the thickness of sections of the article.

The present invention relates to a method for preferentially in-mold coating a molded article or substrate in at least one predetermined area based upon the thickness or depth of the article. A first composition is molded into an article or substrate in a mold, preferably by injection molding techniques known in the art. A second composition is applied to the substrate in-mold, wherein the second composition is directed to at least one predetermined area of the substrate based on the compressibility thereof.

Molded substrates often have complex designs or configurations and heretofore, it has been difficult or impossible to produce an in-mold coated article which has been properly or fully coated to desired specifications.

Advantageously, it has been found that the flow of in-mold coating over an article can be effectively controlled, whereby the coating can be channeled or routed so that the coating on the substrate surface conforms to design specifications. The in-mold coatings are preferably channeled by providing the substrate with areas of varying thickness or depth below the surface to be coated. It has been found that substrate areas of greater depth promote in-mold coating flow relative to less thick areas. The present invention also teaches a method for controlling the thickness of an in-mold coating on a substrate.

The present invention provides a method for producing molded articles with coatings in predetermined areas which are suitable for use as-is in an end use application or which require minimal or no surface post-treatment.

A further object of the present invention is to eliminate the need of applying additional paint or other surface treatment coatings to a surface of a pre-formed work piece.

Yet another object of the present invention is to provide a work piece having an appearance in-mold coating thereon, which has paint-like properties, such as high gloss, hardness, good adhesion and good weatherability.

A further object of the present invention is to provide a work piece having an in-mold coating thereon, which has good flow and coverage during molding, good adhesion, uniform color, durability, weather resistance, good surface qualities, and good paintability.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping out of the mold cavity. The in-mold coating containment flange extends substantially completely around the perimeter of a coated molded substrate surface.

BRIEF DESCRIPTION OF THE DRAWINGS

The invention will be better understood and other features and advantages will become apparent by reading the detailed description of the invention, taken together with the drawings, wherein:

FIG. 2 is a cross section through a vertical elevation of a mold cavity.

FIG. 3 is a top view of a molded substrate prior to being coated with an in-mold coating. The substrate is shown having an area of increased thickness in order to promote and/or channel in-mold coating flow.

DETAILED DESCRIPTION OF THE INVENTION

The present invention relates to producing a molded article or substrate having a coating bonded thereto. The coating is present on the surface of the substrate in a predetermined area or areas. In-mold coating thickness can also be controlled by the method of the present invention.

The method of the present invention provides a process for controlling the flow of an in-mold coating so that it can be channeled or routed on a substrate to result in a coating having a uniform thickness or appearance on a large or complex shape. The in-mold coating can be channeled to coat an entire surface of a substrate or only selected areas thereof.

The method of the present invention can generally be practiced on any molding apparatus such as injection molders capable of producing a molded article or substrate of a first composition and then coating the article or substrate with a second composition, i.e. an in-mold coating.

Figure 1:
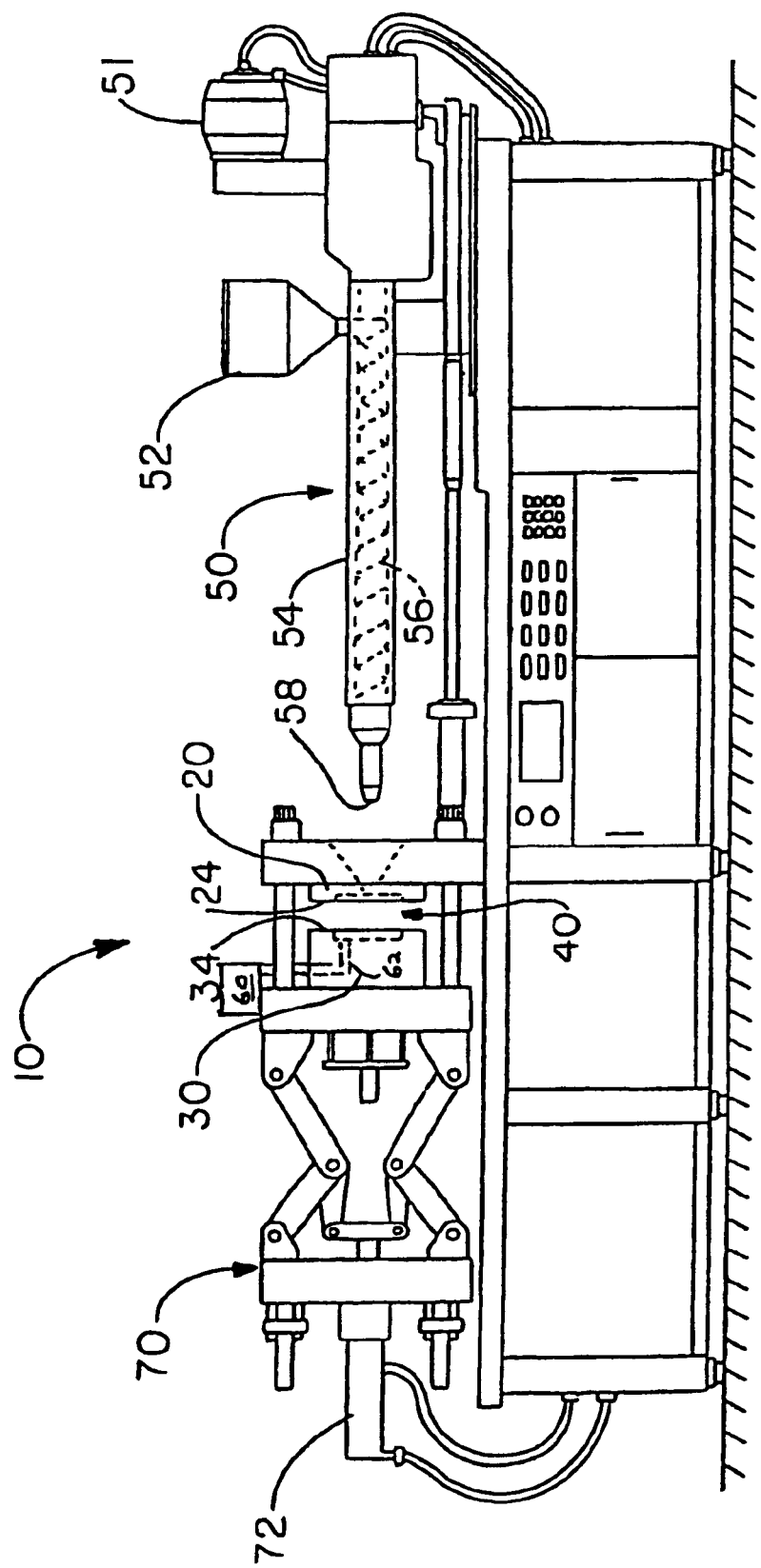
FIG. 1 is a side view of one embodiment of a molding apparatus suitable for practicing the method of the present invention.

Making reference now to the drawings wherein like numerals indicate like or corresponding parts throughout the several figures, a molding apparatus suitable for the practice of the present invention is shown in FIG. 1, and is generally designated 10.

Molding apparatus 10 includes a first mold half 20 which preferably remains in a stationary or fixed position relative to a second moveable mold half 30. FIG. 1 shows the mold halves in an open position. The first mold half and second mold half are adapted to slidingly mate, or nest, thereby forming a mold cavity 40 therebetween as shown in at least FIG. 2. The mold halves mate along surfaces 24 and 34 (FIG. 1) when the molding apparatus is in the closed position, forming a parting line 42 (FIG. 2) therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the first composition injector and the second composition injector. The pressure exerted by the clamping mechanism ranges generally from about 2,000 to about 15,000, desirably from about 4,000 to about 12,000, and preferably from about 6,000 to about 10,000 pounds per square inch (psi) of mold surface.

In FIG. 2, the mold halves 20 and 30 are shown in a closed position, abutted or mated along parting line 42 at face surfaces 24 and 34. As illustrated, the mold cavity is shown in cross section. It is readily understood by those skilled in the art that the design of the cavity can vary greatly in size and shape according to the end product to be molded. The mold cavity generally has a first surface 44 on the second mold half 30, upon which a show surface of an article will be formed, and a corresponding back side or opposite second surface 46 on the first mold half 20. The mold cavity also contains separate orifices to allow the first and second composition injectors to inject their respective compositions thereinto. The location of the injectors and injection orifices thereof can vary from apparatus to apparatus, and part to part, and can be based on factors such as efficiency, functionality, or desire of the mold designer.

As shown in FIG. 1, the first composition injector 50 is a typical injection molding apparatus which is well know to those of ordinary skill in the art and is capable of injecting a thermoplastic or thermosetting composition, generally a resin or polymer, into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition can be placed in hopper 52 and rotating screw 56 moves the composition through the heated extruder barrel 54, wherein the material is heated above its melting point. As the material collects in the end of the barrel, the screw acts as an injection ram and forces it through the nozzle 58 into the mold cavity 40. The nozzle generally has a non-return valve at the nozzle or screw tip to prevent the backflow of material into the screw.

The first composition injector is not meant to be limited to the embodiment shown in FIG. 1 but can be any apparatus capable of injecting a thermoplastic composition into the mold cavity. Suitable injection molding machines are available from Cincinnati Milacron, Battenfeld, Engel, Husky, Boy and others.

The present invention for selectively controlling the flow of in-mold coatings can be practiced on generally any thermoplastic substrates which can be injection molded. Suitable thermoplastic substrates, include but are not limited to polyethylene terephthalate (PET), nylon, acrylonitrile butadiene styrene (ABS), polystyrene, polycarbonate, acrylic, acetal, polyolefins such as polyethylene and polyethylene, polypropylene, and polyvinyl chloride (PVC). The foregoing list is not meant to be exhaustive but only illustrative of the various materials useful in the practice of the invention.

It has been found that a surface of the substrate can be selectively coated with in-mold coatings in predetermined areas by controlling or modifying the thickness or depth of the substrate. When utilized in the present invention, thickness or depth is defined as a distance, girth, or dimension from one surface to the opposite surface of the substrate. The method of the present invention is generally concerned with the depth between two surfaces, the first being a surface to which an in-mold mold coating is selectively directed or applied, commonly referred to as a show or appearance surface, and the back surface that is substantially the opposite side of the substrate. The in-mold coating may but does not necessarily cover the entire show surface. For example, in FIG. 3 thickness refers to the distance from show surface 82 of a substrate to the backside or opposite surface 108. As shown in FIG. 3, the thickness between the show surface and back side of the substrate can vary.

Each substrate of the present invention inherently has a compressibility factor or percentage, wherein at a given temperature each specific substrate is compressible to a certain calculable percentage. Therefore, even though a molded article or substrate has a single compressibility ratio, a first area of a substrate which is thicker relative to a second area of the substrate will be able to compress a greater thickness or distance than the second substrate. For example, substrate "A" has a compressibility ratio of 20 percent at a certain temperature. Therefore, a portion of substrate "A" which has a thickness of 2.0 cm can compress 0.4 cm, whereas a portion of the substrate which has a thickness of 1.0 cm can only compress 0.2 cm at the given temperature.

The above described substrate compressibility can be utilized to selectively coat predetermined areas of a substrate. Substrate compressibility can also be utilized to effectively direct the flow of an in-mold coating into certain areas or pathways of a substrate.

Figure 4:
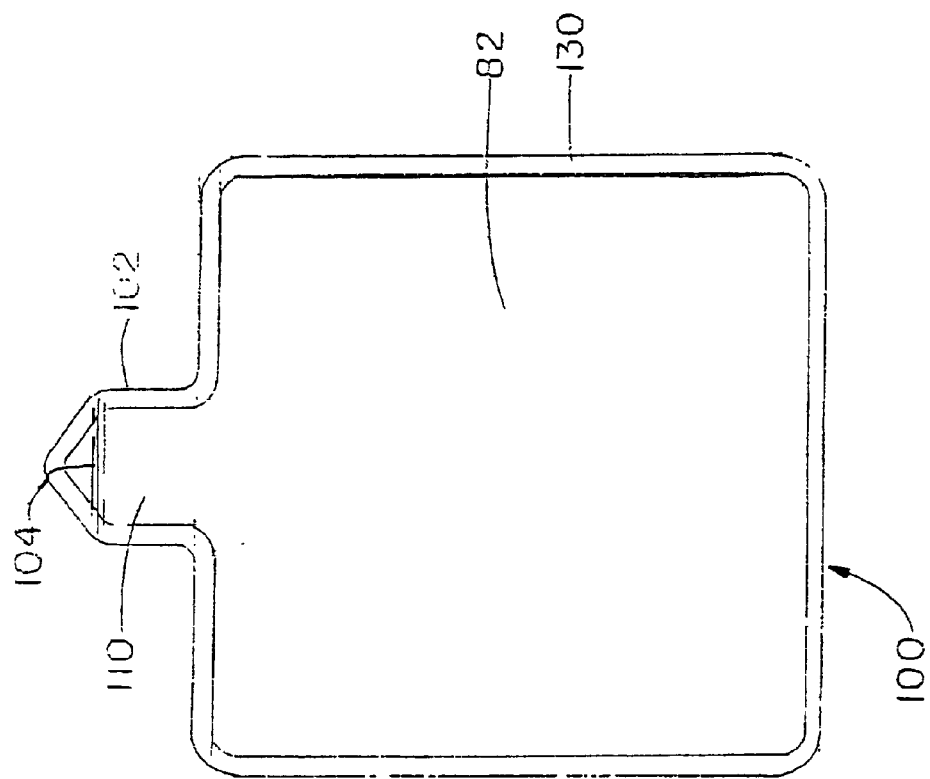
FIG. 4 is a front view of the substrate shown in FIG. 3.

The present invention is not meant to be limited to the following example. As shown in FIG. 2, an in-mold coating or second composition injector 60 (FIG. 1) has a nozzle 62 which is located on the molding apparatus in a suitable location such as on mold half 30. A first quantity of a first composition is injected into a mold cavity to a desired predetermined level, forming a substrate, work piece, or article, such as plaque 100 shown in the views of FIGS. 3–5. As shown in FIG. 3, the substrate has at least a show surface 82 and a back side 108. An in-mold coating composition (shown as 90 in FIGS. 7 and 8) is then injected into the mold cavity from in-mold coating injector 60. The in-mold coating is injected through at least one nozzle 62 onto the show surface side of the substrate at a location such as 104 on tab 110 as shown in FIG. 4.

It is important to note that the mold is not opened or unclamped before and/or during in-mold coating application, that is, the mold halves maintain a parting line and generally remain a substantially fixed distance from each other while both the first and second compositions are injected into the mold cavity as described herein.

The in-mold coating composition spreads out, disperses, or radiates from the point of injection 104 onto the show surface of the substrate. The point of injection of the in-mold coating onto the substrate will depend on the location of the in-mold coating injector and nozzle thereof in the molding apparatus. Accordingly, the point of injection of the in-mold coating can be located substantially anywhere on the substrate show surface and is not limited to the locations shown in the drawings of the present invention.

One embodiment of the present invention relates to a method for directing or channeling the flow of an in-mold coating on a substrate. Unexpectedly, it has been found that substrate compressibility can be utilized to direct in-mold coating flow for in-mold coating systems which are conducted "closed clamp", wherein the mold halves remain abutted or closed at least during the time between injection of a first composition and an in-mold coating composition. That is, the parting line between the mold halves is not separated during the molding operation in which an in-mold coated substrate is produced. When mold halves 20, 30 are closed or joined, a mold cavity 40 is formed therebetween. The mold cavity has a configuration with a specific defined volume. A predetermined amount of a first composition which will produce a desired substrate is injected into the mold cavity. By the term predetermined, it is understood by one of ordinary skill in the art that through the control of variables of the molding process, a calculated amount of material that will produce a desired substrate can be experimentally determined. After the first composition has been injected into the mold cavity and has cooled below the melt point or otherwise reached a temperature sufficient to accept or support an in-mold coating, a predetermined amount of in-mold coating is injected from injector unit 60 through at least one nozzle onto an injection point of the substrate, preferably on a show surface thereof. The coating is injected at a pressure that ranges generally from about 500 to about 5,000, desirably from about 1,000 to about 4,500, and preferably from about 2,000 to about 4,000 pounds per square inch (psi). The injection pressure promotes the spread of the in-mold coating away from the nozzle. The in-mold coating spreads from the nozzle between a mold surface and a surface of the substrate.

Unexpectedly, it has been found that by varying the thickness or depth of the resin of the substrate below the surface to be coated, the in-mold coating can be routed to preferred areas of the substrate, and contained therein, if desired. For example, if a mold cavity is designed so that a substrate has a constant thickness under an area to be in-mold coated, the in-mold coating will spread out from the location of injection in a substantially radial, even, or constant manner. Under the same relative conditions, if a substrate is formed having areas which vary in thickness under the surface area to be coated, the in-mold coating can be channeled to flow in area(s) of greater relative thickness. Thus, the depth of the coating can also vary on the coated surface. It has been demonstrated, as stated hereinabove, that the compressibility of the substrate allows a substrate area having a greater depth relative to a second area to compress more and better accommodate in-mold coating flow and promote migration thereof.

Figure 5:
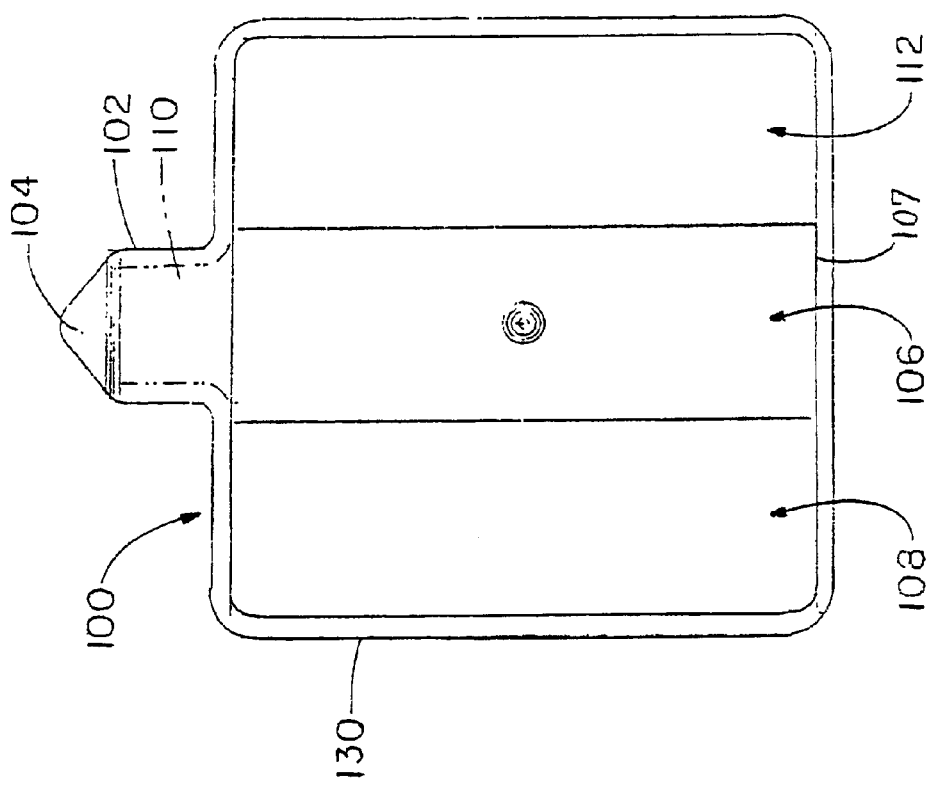
FIG. 5 is a back view of the substrate shown in FIG. 3, wherein areas of varying depth are distinctly shown.

In another embodiment of the present invention, a substrate is provided with an area or section of increased thickness around the point or location where the in-mold coating is injected onto the substrate in order to promote in-mold coating flow. By increased thickness, it is to be understood that the thickness of the substrate around the in-mold coating injection location is greater than at least one other area or section of the substrate. As shown in FIG. 5, plaque 100 is shown with tab 110 at a location of in-mold coating injection. The tab area thickness can be varied to enhance channeling of the in-mold coating. Tab 110 in FIG. 4 includes a thin section or in-mold coating containment tab flange 102 which prevents the in-mold coating from flowing out of the mold cavity. The concept of the containment flange will be further explained hereinbelow. The relatively thick tab area promotes in-mold coating flow from the in-mold coating nozzle onto the show surface 82 of the substrate. The in-mold coating will tend to avoid tab or other substrate sections of minimal or lesser thickness.

Figure 6:
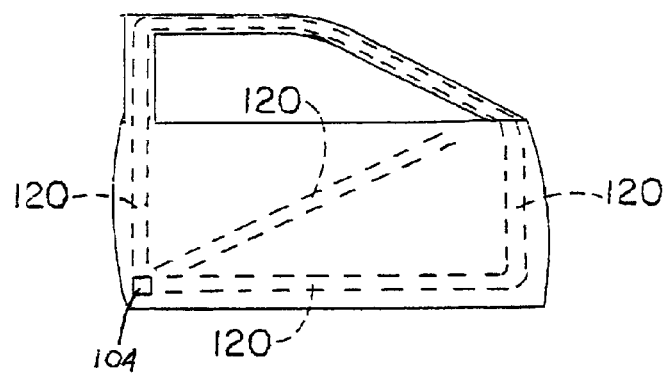
FIG. 6 is a side view of a molded door panel. The door panel is provided with areas of varying depth in order to channel in-mold coating flow over the surface so that the same is coated in desired areas in order to meet a predetermined standard.

In a further embodiment of the present invention, a substrate is provided with at least one "runner" section, preferential flow channel, or area to promote in-mold coating flow on a substrate. A runner section is an area which is relatively thicker than another area adjacent thereto, wherein the in-mold coating can be preferably routed to flow. Advantageously, runner sections can be provided on substrates of complex design or which were previously difficult to coat. A runner section generally is located in an area on the substrate beginning in the region of the point of injection of the in-mold coating and extending away therefrom to a predetermined point or terminus on the substrate. For example, FIG. 5 has a runner section 106 extending from and including the tab area to substantially the bottom end 107 of the plaque. FIG. 6 shows a door panel having three runner sections 120. By providing a substrate with at least one runner section, in-mold coatings can be effectively routed or channeled to cover desired areas of a substrate.

Depending on the amount of in-mold coating injected into the mold cavity, the show surface substrate having a runner section can be completely coated or coated only in certain areas or sections such as the runner areas. The amount of coating applied and thickness thereof can vary from part to part.

The depth of the runner section can vary depending on the substrate to be coated and design specifications. A substrate can have a runner section extending from an area of in-mold coating injection which is so relatively thick that all of the in-mold coating application to the substrate surface will substantially remain in the runner section. Therefore, as can be imagined, many unique effects can be created by utilizing runner sections. Frequently, it is desirable to completely coat the show surface with an in-mold coating. It is often difficult to coat a substrate having a complex or detailed shape. Runner sections can be used to effectively in-mold coat these substrates by channeling in-mold coating to the previously hard to coat areas. For example, a runner section can be utilized to channel a coating to a distal part of a substrate surface. The runner section thickness can be gradually decreased such as in a direction away from the point of injection as needed, or even separated or divided into more than one runner section to accomplish a desired effect or coating.

In yet another embodiment of the present invention, a molded substrate or article is provided with an in-mold coating containment flange 130. As shown in at least FIG. 4, coating containment flange preferably extends completely around the perimeter of a substrate, specifically plaque 100. Often, it is desirable to substantially coat the show surface of a substrate with an in-mold coating. The containment flange 130 acts a barrier and prevents the in-mold coating from leaking or seeping out of the mold cavity and potentially blowing out of the parting line between the mold halves.

As shown in at least FIG. 3, flange 130 is generally offset or formed in a plane below the plane of the show surface 82. Thus, the show surface has an edge or border 83 which transitions into flange 130. Show surface edge 83 drops off into a wall at an angle of about 90° relative to the show surface. Substrate wall 86 terminates at flange portion 130, wherein flange portion extends at an angle of about 90° in relation to wall 86. It is believed that the relatively sharp angles between show surface and flange 130 as well as the relative incompressibility of the thin flange act as a substantial barrier to coating flow, and thus prevent the coating from leaving the show surface. The flange generally has a thickness less than the thinnest portion or area of the substrate. As shown in FIG. 3, containment flange 130 is thinner than section 112, the relatively thinnest section of the substrate. The in-mold coating containment flange encompasses substantially the entire perimeter of a substrate surface that will be or is coated. The flange has a width of at least generally about 0.225 to about 0.176, desirably about 0.175 to about 0.076, and preferably about 0.075 to about 0.045 inches. As stated above, the main purpose of the flange is to prevent the in-mold coating from leaving the target surface of the substrate and stopping the coating from giving entrance to the mold parting line.

Figure 7:
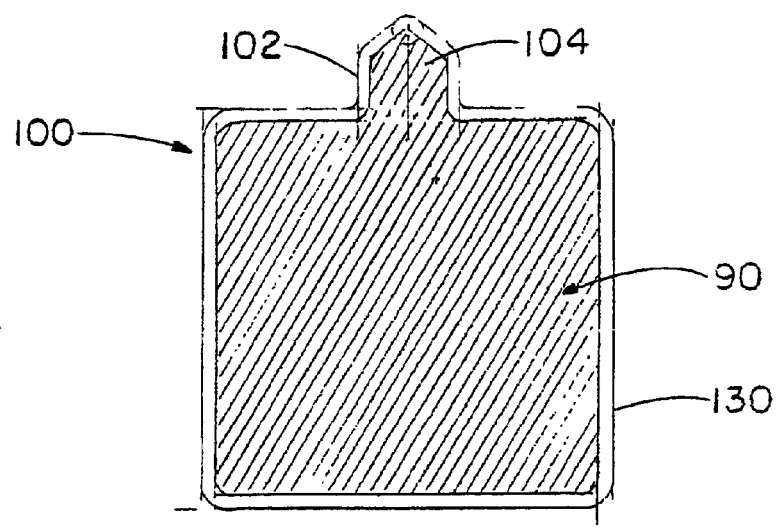
FIG. 7 is the substrate of FIG. 4 having an in-mold coating on a show surface thereof.
Figure 8:
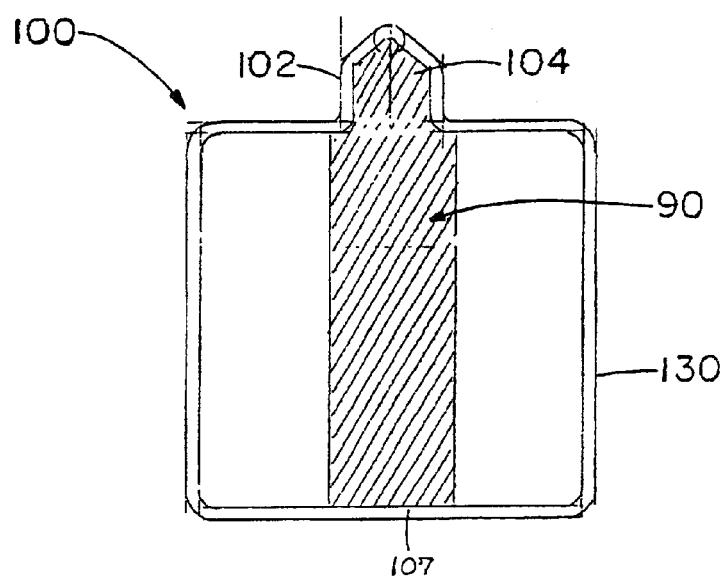
FIG. 8 is the substrate of FIG. 4 having an in-mold coating located substantially only in a runner section of the show surface.

As shown in FIG. 7, the in-mold coating 90 covers the entire show surface of the molded substrate. Due to the configuration of the molded substrate as well as other molding variables, the coating 90 does not cover or coat the containment flange 130. However, it is permissible for the in-mold coating to coat or partially coat the containment flange. Due to the design of the containment flange, generally less than about 10%, desirably less than 5%, and preferably less than 1% by weight of the in-mold coating covers or coats the containment flange. The containment flange is free of any other substrate material on the distal edge thereof. This is, there is no other substrate material or outer edge between the containment flange and the mold cavity parting line.

The process of the present invention utilizes in-mold coatings, many of which are available commercially. Such coatings include GenGlaze® and Stylecoat®, acrylic based appearance in-mold coatings available from Omnova Solutions Inc. of Fairlawn, Ohio, as well as others. These and other coatings are well known to the art. One suitable in-mold coating (an acrylic coating) is found in U.S. Pat. No. 5,777,053, herein incorporated by reference. The main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and containing few molecules that are nonfunctional or only monofunctional, are useful in the present invention. Epoxy resins are also useful as in-mold coatings in the present invention. A principal use of epoxy resins is as a component in two-package primer coatings. One part contains the epoxy resin and the other part contains a polyfunctional amine. Amine-terminated polyamides, sometimes called amido-amines; are widely used. A preferred acrylic resin is an epoxy-based oligomer having at least two acrylate groups and at least one copolymerizable ethylenically unsaturated monomer, and at least one copolymerizable monoethylenically unsaturated compounds having a —CO—, group and a —NH$_2$—, NH, and or —OH— group.

The present invention also contemplates the use of other resin coatings, such as alkyds, polyesters, urethane systems, amino resins, phenolic resins, and silicone resins. See e.g., Kirk Othmer, Encyclopedia of Chemical Technology, Vol. 6 (4th ed. 1993) at pp. 676–690.

In-mold coatings comprising five components, namely
1) a saturated aliphatic polyester intermediate urethane
2) an aliphatic polyether
3) an aliphatic or cycloaliphatic portion (meth)acrylate
4) hydroxy alkyl (meth)acrylates
5) vinyl substituted aromatics have been found to have particular utility in the practice of this invention. In-mold coating compositions are prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last. The polyacrylate ester of a polyol can be present in the polyester urethane acrylate from the supplier. This in-mold coating composition is clear after curing.

Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any suitable mixing vessel can be utilized, and the various components and additives mixed until the compounds are blended. Even if pigments are not contained in the blend, the mixture at this point is not clear.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers, such as talc, can be utilized. Other additives include hardeners, thixotropes, such as silica, and adhesion agents, such as polyvinyl acetate.

EXAMPLES

Example 1

Figure 9:
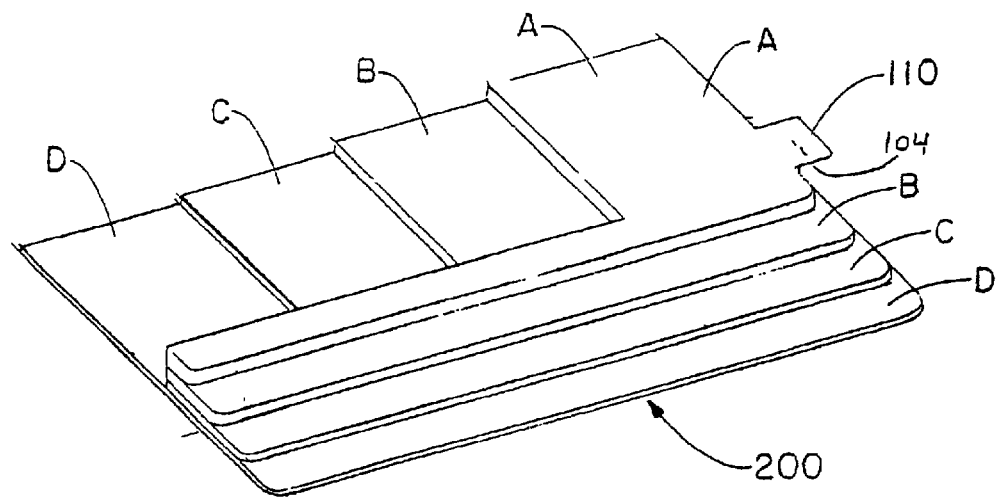
FIG. 9 is a perspective view, not shown to scale, of a molded plaque with areas of varying thickness illustrated.

A mold used to produce the plaque 200 shown in FIG. 9 was made. The mold cavity width is 12.0 inches. The mold cavity length is 20.5 inches. The mold has a hydraulic mold gate located in the center of the cavity for injection of a substrate. The mold has a tapered tab for the introduction of the IMC onto the part surface. The tab is located at the edge portion of the mold. The tab and Section A have thicknesses of 0.120 mils. Section B is 0.100 mils thick. Section C is 0.080 mils thick. Section D is 0.060 mils thick. As shown in FIG. 9, the plaque has four panels in a horizontal plane on the left side of the part and four panels in a vertical plane on the right side of the part. The panels on the horizontal plane on the right side of the part measure 6.0 inches long and 5.125 wide. The panels on the vertical plane measure 1.50 inches wide and 20.5 inches long. The plaque does not have an in-mold coating containment flange. The mold was placed in an 850 ton Cincinnati Milacron Vista injection molding machine. ABS resin heated to a temperature of 480° F. was injected into the mold cavity thus producing the part shown in FIG. 9 having sections with the above-described dimensions. FIG. 9 is a front view of the plaque. As stated above, the various sections A–D represent varying thicknesses of the plaque in the defined areas. The front of the plaque shown in FIG. 9 is a smooth surface and thus, the backside of the plaque shows the various thickness contour variations. After a hold time of approximately 120 seconds, an in-mold coating, Stylecoat® was injected through the tab portion of the plaque onto the front surface of the plaque. The chart below details how the in-mold coating flowed onto the different sections of the plaque.

| Amount of IMC | % of Full IMC Shot | Section A % Fill/mils* | Section B % Fill/mils* | Section C % Fill/mils* | Section D % Fill/mils* |
|---|---|---|---|---|---|
| .32 cubic inches | 25 | 75/1 | 15/.5 | 0/0 | 0/0 |
| .64 cubic inches | 50 | 98/3 | 85/1.6 | 10/.6 | 0/0 |

*1 mil = 0.001 inch

It was determined from the part surface area to be coated, and the desired coating thickness, that an in-mold coating amount of 1.2 cubic inches would produce a full in-mold coating shot and cover the entire plaque. As can be seen from the chart, upon in-mold coating injection onto the plaque surface, the top left panel and the inside vertical panel (runner section A) were preferentially coated when 25% of a full shot was utilized. Thus, this example shows that Section A is an effective runner section whereby the coating prefers to flow down the plaque along Section A and out to the side thereof before flowing into thinner sections B, C, and D. When 50% of a full in-mold coating shot was utilized, the in-mold coating began to flow from Section A and B into Section C. It is important to note that the plaque shown in FIG. 9 does not contain an in-mold coating containment flange. When coating levels above 50% of a full shot were utilized, the same leaked or seeped out of the mold cavity through the parting line. Thus, the need is clearly shown for an in-mold coating containment flange in order to keep the in-mold coating on the desired substrate surface It has further been shown by the example that preferential coating of preferred or runner sections of a plaque can be obtained by utilizing the thickness of the wallstock to guide the in-mold coating across the part surface.

Example 2

Figure 10:
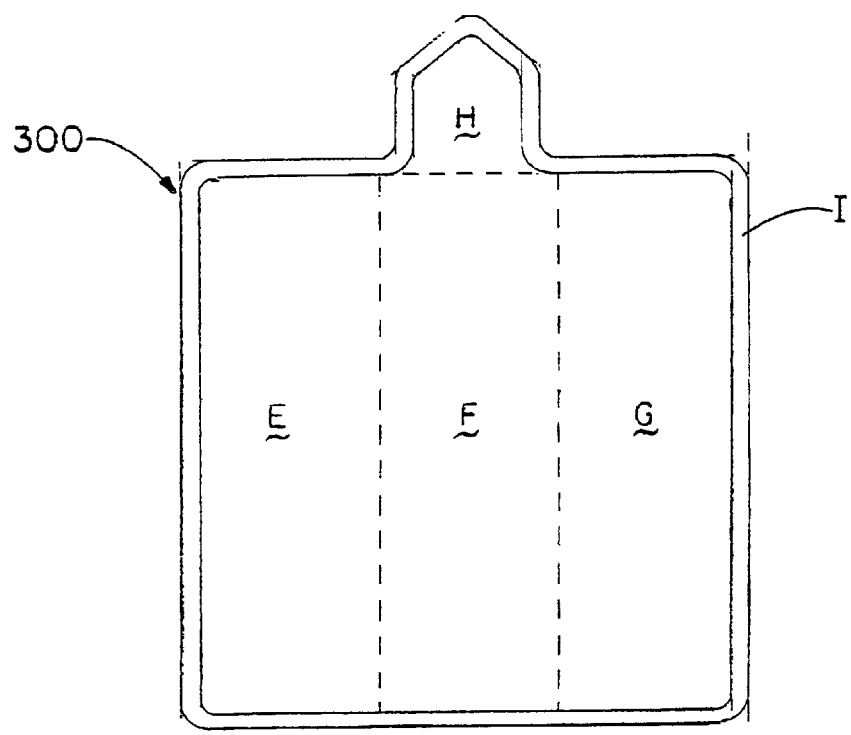
FIG. 10, is a front elevational view of a molded plaque with a substantially flat show surface.

FIG. 10 shows a thermoplastic article with a variety of substrate (thermoplastic) thicknesses. It was shown through experimentation that in-mold coating flow is influenced by the substrate thickness. The example parts were generated using a 50-ton injection molding machine, a 6-inch square steel mold cavity fitted with an IMC injection nozzle. The substrate material was a PET thermoplastic and the in-mold coating was OMNOVA's Stylecoat® IMC. The mold temperature was 250° F. with a 30 second delay time prior to IMC injection.

In FIG. 10, sections E, F, and G are representations of varying part thickness as shown by the chart below. Section H represents the in-mold coating tab design utilizing a thicker middle section which facilitates an in-mold coating flow channel at the in-mold coating nozzle tip site. Section I represents the thin sectioned containment flange.

The overall objective in designing a mold with thin and thick sections is to preferential channel the in-mold coating flow path in a desirable fashion. This can be manifested in several ways which include:

1. A channeling of the in-mold coating flow at the in-mold coating tab site (Section H) which preferentially deposits the in-mold coating inside the mold parting line onto the surface of the part.
2. A channeling of the in-mold coating flow in the part to more critical areas to fill since selective in-mold coating may be necessary in certain article designs (Sections E, F, and G).
3. A restriction of in-mold coating flow along the periphery of the mold to contain the in-mold coating on the surface of the part and within the parting line (Section I).

The observed in-mold coating coverage for the 6×6 mold is as follows:

| % of full IMC Shot | Section E % Fill/mils* | Section F % Fill/mils* | Section G % Fill/mils* | Section H % Fill/mils* | Section I % Fill/mils* |
|---|---|---|---|---|---|
| 50 | 100/3 | 80/2 | 20/1 | 100/2 | 0/0 |
| 80 | 100/4 | 100/3 | 40/2 | 100/3 | 0/0 |
| 100 | 100/4 | 100/3 | 100/3 | 100/4 | 0/0 |

Note:
Section E = 115 mils (thickness)
Section F = 85 mils
Section G = 60 mils
Section H = in-mold coating tab - 60 mils
Section I = containment flange - 25 mils
*1 mil = 0.001 inch In the example(s) we have shown that this preferential flow mechanism has advantages which include:
1. Preferential IMC flow and deposition to selected regions on a part as a result of varying thickness.
2. Achieving the containment of IMC on the part surface within the parting line resulting from a designed thin sectioned, IMC flow restricting, "containment flange."

In accordance with the patent statutes, the best mode and preferred embodiment have been set forth, the scope of the invention is not limited thereto, but rather by the scope of the attached claims.

What is claimed is:

1. A method for promoting preferential flow of an in-mold coating on a substrate comprising the steps of:
   (a) forming a substrate between a pair of mold halves that are a substantially fixed distance relative to one another, said substrate having at least one area of increased dimensional thickness relative to at least one adjacent area;
   (b) coating said substrate between said pair of mold halves which remain said fixed distance relative to one another with an in-mold coating so that said substrate area of increased dimensional thickness is preferentially coated relative to said substrate area without increased dimensional thickness.

2. The method according to claim 1, wherein said at least one adjacent area includes an in-mold coating containment flange situated about at least a portion of a perimeter of said substrate that has a dimensional thickness sufficiently incompressible to resist receiving said in-mold coating which prevents said in-mold coating from leaking into a parting line of a mold cavity defined between said pair of mold halves.

3. The method according to claim 1, wherein said at least one area of increased dimensional thickness is a runner section extending across at least a portion of said substrate which promotes flow of said in-mold coating along said runner section and portions of said substrate adjacent said runner section.

4. The method according to claim 3, wherein said runner section extends on said substrate from an in-mold coating injection inlet area to a predetermined end location spaced apart from said in-mold coating injection inlet area.

5. The method according to claim 1, wherein said at least one area of increased dimensional thickness includes an in-mold coating injection inlet area, said inlet area located in an area of said substrate where an in-mold coating is injected onto said substrate, said inlet area having at least two different thicknesses to channel flow of said in-mold coating onto said substrate.

6. The method according to claim 5, wherein said inlet area is a tab which includes a thick central portion and a relatively thin outer perimeter which partially surrounds said thick central portion.

7. A method for molding and selectively coating in the mold a substrate, comprising the steps of:
   molding the substrate between at least two separable mold members which form a closed mold cavity therebetween at a temperature and a clamp pressure sufficient to form the substrate, said mold cavity having areas of varying thickness which allow said molded substrate to have areas of varying thickness;
   injecting a suitable amount of coating into the mold cavity on a surface of the substrate while maintaining the mold members at said clamp pressure whereby said coating covers portions of said areas of varying thickness that are relatively thicker and have a compressibility sufficient to accept said coating to a greater degree than portions of said areas of varying thickness that are relatively thinner or have a compressibility insufficient to accept said coating.

8. The method according to claim 7, wherein said substrate includes an in-mold coating containment flange having a compressibility insufficient to accept said coating situated about a perimeter of said substrate which prevents said in-mold coating from leaking into a parting line of a mold cavity.

9. The method according to claim 7, wherein said portions of said areas of varying thickness that are relatively thicker and have a compressibility sufficient to accept said coating include a runner section which promotes flow of said in-mold coating along said surface of said substrate.

10. The method according to claim 9, wherein said runner section extends on said substrate from an in-mold coating injection inlet area to a predetermined end location spaced apart from said inlet area.

11. The method according to claim 7, wherein said portions of said areas of varying thickness that are relatively thicker and have a compressibility sufficient to accept said coating include an in-mold coating injection inlet area, said inlet area located in an area of said substrate where an in-mold coating is injected onto said substrate, said inlet area having at least two different thicknesses to channel flow of said in-mold coating onto said substrate.

12. The method according to claim 11, wherein said inlet area is a tab which includes a thick central portion and a relatively thin outer perimeter which partially surrounds said thick central portion.

13. The method according to claim 1, wherein said area of increased dimensional thickness that is preferentially coated receives a greater amount of said in-mold coating as a result of said area of increased dimensional thickness compressing a greater amount than said at least one adjacent area.

14. The method according to claim 1, wherein said at least one adjacent area has a dimensional thickness sufficiently incompressible to resist receiving said in-mold coating.

15. A method of molding a substrate and controlling flow of an in-mold coating on the molded substrate, the method comprising the steps of:

providing a closed cavity defined between at least two mold members that remain a substantially fixed distance relative to one another such that said closed cavity has a substantially fixed volume;

injecting a molten resin into said closed cavity having said substantially fixed volume to create a molded substrate, said closed cavity having a configuration such that said molded substrate has at least one area of increased dimensional thickness relative to an adjacent area;

injecting an in-mold coating into said closed cavity having said substantially fixed volume between said molded substrate and said mold members to in-mold coat said molded substrate; and controlling flow of said in-mold coating on said molded substrate by said area of increased dimensional thickness compressing a greater amount than said adjacent area.

16. The method according to claim 15, wherein said area of increased dimensional thickness receives said in-mold coating and said adjacent area does not receive any in-mold coating because said adjacent area has a dimensional thickness too small to be compressed sufficiently for receiving said in-mold coating.

17. The method according to claim 15, wherein said adjacent area is an in-mold coating containment flange that is situated about a perimeter of said molded substrate which prevents said in-mold coating from leaking into a parting line of said closed cavity.

18. A method of injection molding, in-mold coating and directing flow of an in-mold coating, the method comprising the steps of:

molding an article in a mold cavity having a substantially fixed volume, said article having thicker areas that are relatively more compressible; and in-mold coating said article with an in-mold coating including the sub-steps of:
injecting said in-mold coating into said mold cavity having said substantially fixed volume such that said in-mold coating is interposed between said article and walls forming said mold cavity;
using said thicker areas that are relatively more compressible to direct flow of said in-mold coating on said article, said thicker areas compressing an amount sufficient to allow said in-mold coating to pass thereon, and
curing said in-mold coating onto said article.

19. The method according to claim 18, wherein said thicker areas include a show surface of said thermoplastic article that receives said in-mold coating thereon, said show surface surrounded by a containment flange that is thinner than said show surface and is insufficiently compressible to receive said in-mold coating thereon.

20. The method according to claim 18, wherein said thicker areas include an inlet area that distributes flow of said in-mold coating across a width of a show surface of said thermoplastic article.

21. The method according to claim 20, wherein a thin area at least partially surrounds said inlet area, said thin area relatively incompressible which prevents in-mold coating from flowing thereon.

22. The method according to claim 18, wherein said thicker areas include a runner section that directs a substantial portion of said in-mold coating across a show surface of said thermoplastic article for coating portions of said show surface that are remotely positioned relative to an injection inlet area of said in-mold coating.

23. A method of in-mold coating a molded substrate comprising the steps of:

injecting a molten resin into a mold cavity having a fixed volume;

forming a molded article in said mold cavity having a show surface and an opposite surface and having at least one area of increased dimensional thickness formed between said show surface and said opposite surface;

injecting an in-mold coating into said mold cavity and onto said show surface of said molded article; and directing flow of said in-mold coating injected onto said show surface with said at least one area of increased dimensional thickness.

24. The method of claim 23 wherein the step of directing flow of said in-mold coating with said at least one area of increased dimensional thickness includes compressing said at least one area of increased dimensional thickness to a greater extent than adjacent areas thereby allowing more in-mold coating to flow over said at least one area of increased dimensional thickness.

* * * * *